United States Patent
Rönneke et al.

(10) Patent No.: US 9,730,177 B2
(45) Date of Patent: Aug. 8, 2017

(54) DEDICATED GATEWAY FOR MOBILE BROADBAND DEVICES

(71) Applicant: Telefonaktiebolaget L M Ericsson (publ), Stockholm (SE)

(72) Inventors: Hans Rönneke, Kungsbacka (SE); Gunnar Rydnell, Göteborg (SE); Stefan Karl Toth, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/042,939

(22) Filed: Feb. 12, 2016

(65) Prior Publication Data
US 2016/0165565 A1    Jun. 9, 2016

Related U.S. Application Data

(63) Continuation of application No. 13/318,201, filed as application No. PCT/EP2009/055477 on May 6, 2009, now Pat. No. 9,301,241.

(51) Int. Cl.
*H04W 60/04*    (2009.01)
*H04W 48/00*    (2009.01)
(Continued)

(52) U.S. Cl.
CPC .......... *H04W 60/04* (2013.01); *H04W 48/17* (2013.01); *H04L 29/06224* (2013.01);
(Continued)

(58) Field of Classification Search
CPC ... H04W 76/00; H04W 76/02; H04W 76/023; H04W 76/04; H04W 76/043; H04W 60/00
See application file for complete search history.

(56) References Cited

U.S. PATENT DOCUMENTS 6,973,313 B1 * 12/2005 Sebastian ............ H04L 12/2697
                                                    370/331
7,983,229 B2    7/2011 Bachmann et al.
(Continued)

OTHER PUBLICATIONS

Non-Final Office Action for U.S. Appl. No. 13/318,201, mailed Dec. 2, 2013, 20 pages.
(Continued)

*Primary Examiner* — Warner Wong
(74) *Attorney, Agent, or Firm* — Withrow & Terranova, PLLC

(57) ABSTRACT

A quite simple and effective way for simplifying the mobile system for the mobile broadband customers, thereby lowering the equipment costs and in the end allowing for more competitive flat rate fees, is to direct the traffic from mobile broadband devices (110) to dedicated gateways (120). The mobile broadband device (110) is comprised in a user equipment (105) in a wireless communication network (100). The wireless communication network (100) comprises a network node (115) is arranged to be connected to the mobile broadband device (110). First, the mobile broadband device (110) sends (200, 300) an attach request message to the network node (115). The attach request comprises an information element indicating that the device (110) is a broadband device. Then, the device (110) receives (301) an attach accept message from the network node (115) comprising address information of the dedicated gateway (120). After the device (110) has received the attach accept message it sends (302, 205) traffic to the dedicated gateway (120).

7 Claims, 6 Drawing Sheets

(51) Int. Cl.
*H04L 29/06* (2006.01)
*H04W 60/02* (2009.01)
*H04W 76/02* (2009.01)
*H04W 88/00* (2009.01)
*H04W 88/16* (2009.01)

(52) U.S. Cl.
CPC ............ *H04W 60/02* (2013.01); *H04W 76/02* (2013.01); *H04W 88/005* (2013.01); *H04W 88/16* (2013.01)

(56) References Cited

U.S. PATENT DOCUMENTS

| | | |
|---|---|---|
| 8,311,552 B1 | 11/2012 | Khalil et al. |
| 8,848,668 B2 | 9/2014 | Bachmann et al. |
| 9,301,241 B2 | 3/2016 | Rönneke et al. |
| 2004/0258239 A1 | 12/2004 | Gallant et al. |
| 2006/0013152 A1 | 1/2006 | Shaheen |
| 2006/0274688 A1 | 12/2006 | Maxwell et al. |
| 2008/0165740 A1 | 7/2008 | Bachmann et al. |
| 2008/0192716 A1 | 8/2008 | Shaheen |
| 2009/0010206 A1 | 1/2009 | Giaretta et al. |
| 2009/0052384 A1 | 2/2009 | Zisimopoulous et al. |
| 2009/0170426 A1 | 7/2009 | Jung et al. |
| 2010/0061226 A1 | 3/2010 | Morishige et al. |
| 2011/0002297 A1* | 1/2011 | Jain .................. H04L 12/66 370/331 |
| 2011/0002299 A1* | 1/2011 | Venkatachalam ....... H04L 12/66 370/331 |
| 2012/0044874 A1 | 2/2012 | Rönneke et al. |

OTHER PUBLICATIONS

Final Office Action for U.S. Appl. No. 13/318,201, mailed May 19, 2014, 22 pages.
Advisory Action for U.S. Appl. No. 13/318,201, mailed Oct. 21, 2014, 7 pages.
Non-Final Office Action for U.S. Appl. No. 13/318,201, mailed Sep. 14, 2015, 15 pages.
Notice of Allowance for U.S. Appl. No. 13/318,201, mailed Jan. 20, 2016, 7 pages.
International Search Report for PCT/EP2009/055477, mailed Mar. 22, 2010, 3 pages.
International Preliminary Report on Patentability for International Patent Application No. PCT/EP2009/055477, mailed Nov. 2, 2011, 6 pages.
European Search Report for European Patent Application No. 14192869.7, mailed Mar. 16, 2015, 7 pages.
Translation of Chinese Search Report for Chinese Patent Application No. 200980159170.1, mailed Oct. 16, 2013, 2 pages.

* cited by examiner

DEDICATED GATEWAY FOR MOBILE BROADBAND DEVICES

This application is a continuation of U.S. patent application Ser. No. 13/318,201, filed Oct. 31, 2011, now U.S. Pat. No. 9,301,241; which is a 35 USC 371 national phase filing of PCT/EP2009/055477 filed on May 6, 2009, the disclosures of which are incorporated herein by reference in their entireties.

TECHNICAL FIELD

This invention generally relates to mobile broadband. More particularly this invention relates to dedicated gateways for mobile broadband devices in Evolved Packet Core (EPC), using Long Term Evolution (LTE) or High Speed Packet Access (HSPA).

BACKGROUND

Mobile broadband is doing its triumphal procession around the world. For the operators offering mobile broadband, the users of mobile broadband are seen as a new customer segment which basically hasn't existed before. These customers are primarily looking for high speed connections to Internet with flat rate charging. The interest in operator provided services may extend to normal Internet Service Provider (ISP) services such as e-mail, but otherwise the interest for operator provider services is little or none. Basically just pure Internet connection, that is, a bit-pipe service is what is demanded.

The mobile system today is very feature rich and many of its features will most likely never be used by the mobile broadband customer segment. Therefore there should be a significant potential for simplifying the mobile system for this segment, thereby lowering the equipment costs and in the end allowing for more competitive flat rate fees. The need for having specific dedicated gateways for mobile broadband users should be even more important as laptop and Mobile Internet Device (MID) vendors start to ship their products with built in integrated mobile broadband modules.

The current technology to direct mobile broadband users to specific gateways (and Gateway GPRS Support Node (GGSN)) is to either to use subscriber information (e.g. specific Home Location Register (HLR) parameters or specific International Mobile Subscriber Identity (IMSI) ranges) or to depend on user equipment configuration of the Access Point Name (APN).

The dependency on subscriber information for directing a mobile broadband user to a dedicated gateway provides a challenge when a user may move his Subscriber Identity Module (SIM) between different devices, for example from his mobile phone to his laptop, when doing an Internet session with his laptop.

In the $3^{rd}$ Generation Partnership Project (3GPP) standard there are some standardized functions which are useful in the bit-pipe segment. One example is subscriber/APN based mechanisms to select a dedicated gateway. Based on subscription or APN configured into the mobile terminal, a user may be connected to Internet via a low cost dedicated gateway. Dependency on user equipment configured APN for directing a mobile broadband user to a dedicated gateway is cumbersome, difficult and costly for the operator to ensure a correct configuration in all the user equipments.

SUMMARY

The objective of this invention is to provide an improved mechanism for directing mobile broadband users to dedicated gateways. The mechanism is based on that mobile broadband devices are programmed to always send a specific indication in the Network Access Server (NAS) information to the Serving GPRS Support Node (SGSN) or Mobility Management Entity (MME). The SGSN/MME who understands this indication uses this knowledge in its selection algorithm to select a dedicated gateway (Gateway GPRS Support Node (GGSN) or Serving Gateway (SGW)/Packet Gateway (PGW)). Access Point Name (APN) decoration is used to differentiate between normal gateways and dedicated gateways. Thereby, the operator can introduce dedicated gateways in his network simply by updating his Domain Name Server (DNS server).

This mechanism may be either standardized or it may be implemented as a "sticky feature". A "sticky feature" would provide an added value for operators and laptop suppliers when they are using this equipment. An added value can for example be direction of mobile broadband devices to dedicated gateways without any additional configuration needed. But having the mechanism standardized would of course also give benefits.

Further objects and advantages are evident from the following.

At least one of the above objects is achieved with the methods or arrangements according to the example aspects and embodiments of the solution herein described.

The objectives set forth above are achieved by providing, in a first aspect of the present solution, a method in a mobile broadband device for directing the mobile broadband device to a dedicated gateway. The mobile broadband device is comprised in a user equipment in a wireless communication network. The wireless communication network comprises a network node arranged to be connected to the mobile broadband device. To direct the mobile broadband device to a dedicated gateway, the device sends an attach request message to the network node. This attach request comprises an information element indicating that the device is a broadband device. Then, the mobile broadband device receives in return an attach accept message from the network node comprising address information of the dedicated gateway, and sends traffic to the dedicated gateway.

In a second aspect of the present solution there is provided a method in a network node for directing a mobile broadband device to a dedicated gateway. The mobile broadband device is comprised in a user equipment in a wireless communication network. The wireless communication network comprises a DNS server which is arranged to be connected to the user equipment. The network node is comprised in the wireless communication network and is arranged to be connected to the mobile broadband device. The network node receives an attach request message from the mobile broadband device. The received attach request comprises an information element indicating that the device is a broadband device. Then the network node selects an algorithm. The selected algorithm is arranged to select a dedicated gateway. When the dedicated gateway is selected, the network node sends an attach accept message to the mobile broadband device and sends an update message to the DNS server.

In a third aspect of the present solution there is provided an arrangement in a mobile broadband device where the mobile broadband device is arranged to be directed to a dedicated gateway. The mobile broadband device is comprised in a user equipment in a wireless communication network. The wireless communication network further comprises a network node which is arranged to be connected to the mobile broadband device. The mobile broadband device arrangement comprises a processor arranged to provide an attach request message. The attach request comprises an information element indicating that the device is a broadband device. The mobile broadband device also comprises a transmitter arranged to transmit the attach request message to the network node and a receiver arranged to receive an attach accept message from the network node comprising address information of the dedicated gateway. The attached accept message is stored in a memory, and traffic to the dedicated gateway is transmitted by the transmitter.

In a fourth aspect of the present solution there is provided an arrangement in a network node. The network node is arranged to direct a mobile broadband device to a dedicated gateway. The mobile broadband device is comprised in a user equipment in a wireless communication network. The wireless communication network comprises a DNS server arranged to be connected to the user equipment. The network node is comprised in the wireless communication network and is arranged to be connected to the mobile broadband device. The network node arrangement comprises a receiver which is arranged to receive an attach request message from the mobile broadband device. The attach request comprises an information element indicating that the device is a broadband device. The arrangement also comprises a memory arranged to store the received attach request message and a processor arranged to select an algorithm. The selected algorithm is arranged to select a dedicated gateway. A transmitter is arranged to send an attach accept message to the mobile broadband device and to send an update message to the DNS server.

Since dedicated gateways are used to direct traffic between the mobile broadband device and the operator, the mobile system has the advantage of being simplified providing only the necessary and required services. The dedicated gateways have features matching the need of mobile broadband users, i.e. the gateways have reduced complexity since advanced features are not demanded. This optimizes the mobile system which lowers the equipment costs and in the end allowing for more competitive flat rate fees. Other advantages are that the mechanism applies to both System Architecture Evolution (SAE)/Evolved Packet Core (EPC) and traditional Gn-based core networks with GGSN, and that it can be used over both evolved Universal Terrestrial Radio Access Network (E-UTRAN) and Universal Terrestrial Radio Access Network (UTRAN)/High Speed Packet Access (HSPA).

BRIEF DESCRIPTION OF THE DRAWINGS

The present solution will now be further described in more detail in the following detailed description by reference to the appended drawings illustrating embodiments of the invention, and in which.

DETAILED DESCRIPTION

A quite simple and effective way for simplifying the mobile system for the mobile broadband customers, thereby lowering the equipment costs and in the end allowing for more competitive flat rate fees, is to direct the traffic from mobile broadband devices to dedicated Gateway GPRS Support Node (GGSN) or dedicated Serving Gateway (SGW)/Packet Gateway (PGW)) in Evolved Packet Core (EPC). The GGSN and SGW/PGW are in the following both called "dedicated gateways" for simplicity. This type of dedicated gateways may be especially equipped and configured to be low cost and with features matching the need of mobile broadband users. Basically the only thing that is needed is an indication in a Network Access Server (NAS) information in the form of a single bit which is always set to "1" by a mobile broadband device and to "0" otherwise. This can be implemented in a Mobile Station Network Capability information element or as a proprietary information element, a Mobile Broadband Device (MBD) information element, in an attach request message. An attach request message is a message by a user equipment to the network in order to perform a General Packet Radio Service (GPRS) or combined GPRS attach.

Figure 1:
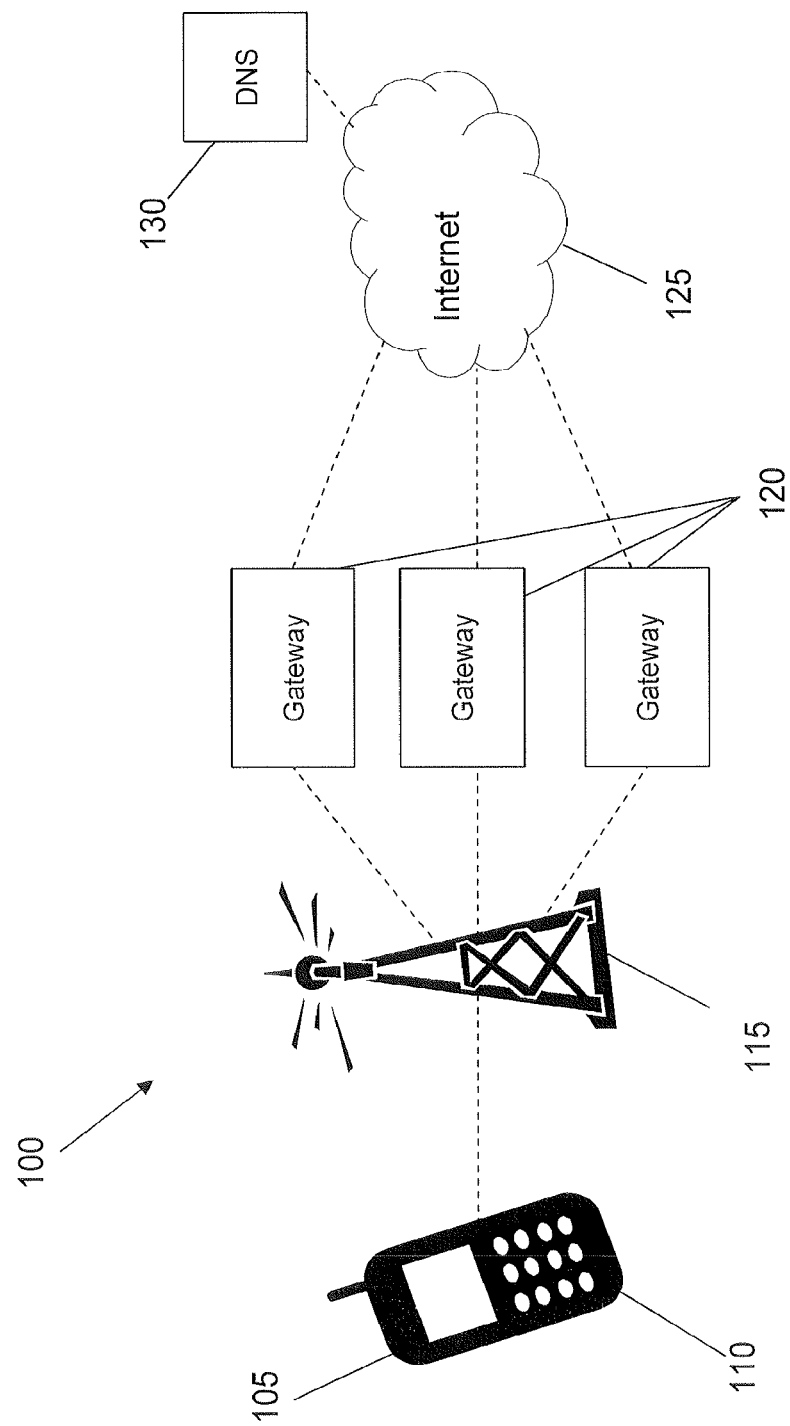
FIG. 1 is a block diagram illustrating a wireless communication network.

FIG. 1 is a schematic block diagram illustrating a wireless communication network 100 using technologies such as Long Term Evolution (LTE) or High Speed Packet Access (HSPA). The wireless communication network 100 comprises a user equipment 105. The user equipment 105 may be any suitable communication device or computational device with communication capabilities, for instance but not limited to Mobile Stations (MS), mobile phone, Personal Digital Assistant (PDA), laptop, electricity meter, MP3 player or portable DVD player or similar media content devices, digital camera, or even stationary devices such as a PC. The user equipment 105 comprises a mobile broadband device 110. Various types of wireless high-speed internet access are provided via the mobile broadband device 110 to the user of the user equipment 105. The wireless communication network 100 further comprises network nodes 115, such as Serving GPRS Support Node (SGSN) or Mobile Management Entity (MME), handling attach requests from the mobile broadband device 110 and algorithms for selecting dedicated gateways 120. The wireless communication network 100 also comprises gateways 120 such as GGSN or SGW/PGW. Traffic from the mobile broadband device 110 to a network 125, such as Internet, is done via a dedicated gateway 120, such as GGSN or SGW/PGW. The network 125 is connected to a Domain Name Server (DNS server) 130. The DNS server 130 comprises a database of domain names and Internet Protocol (IP) addresses of gateways 120.

The present solution suggests that mobile broadband devices 110 are programmed to always send a specific indication in the NAS information to the SGSN or MME 115 indicating a mobile broadband device 110, and thus that a dedicated gateway 120 should be provided. The SGSN/MME 115 who understands this indication uses this knowledge in its selection algorithm to select a dedicated gateway 120, GGSN or SGW/PGW. Access Point Name (APN) decoration is used to differentiate between normal gateways and dedicated gateways. Thereby the operator can introduce dedicated gateways 120 in his network simply by updating his DNS server 130.

This solution may be either standardized or it may be implemented as a "sticky feature", i.e. build-in mobile broadband modules. The added value of this is the direction of mobile broadband devices 110 to dedicated gateways 120 without any additional configuration needed. But having the mechanism standardized would of course also give benefits.

The specific indication in the NAS information indicating mobile broadband devices 110 and that gives an instruction that the mobile broadband device 110 shall be programmed to always send traffic to the SGSN or MME 115 can be done in different ways. One alternative is to standardize the mechanism. A second alternative is to implement the feature as a "sticky feature".

If the present solution is implemented as a "sticky feature" there are at least two requirements that must be fulfilled:
1. Core network nodes from other vendors shall ignore this indication and must not be affected by it.
2. The proprietary solution, i.e. the build-in module, used must not clash with other mechanisms being standardized in 3$^{rd}$ Generation Partnership Project (3GPP) at a later stage.

The solution to convey the indication of a mobile broadband device 110 with these requirements is to define a new information element which contains the indication. An information element ID (IEI) for the new information element is selected in the upper part of the range where it is very unlikely that 3GPP uses it for a long time. If it happens in the future when this feature has become a de facto standard in the networks, that information element ID can always be reserved in 3GPP. This new information element is passed by the mobile broadband device 110 in an attach request message. The attach request is sent by the user equipment 105 to the network, e.g. the SGSN or MME, in order to perform a GPRS or combined GPRS attach. In addition to an indication of a mobile broadband device 110, the new information element may also comprise other information and indications, such as e.g. the required band width of the broadband device.

Figure 2:
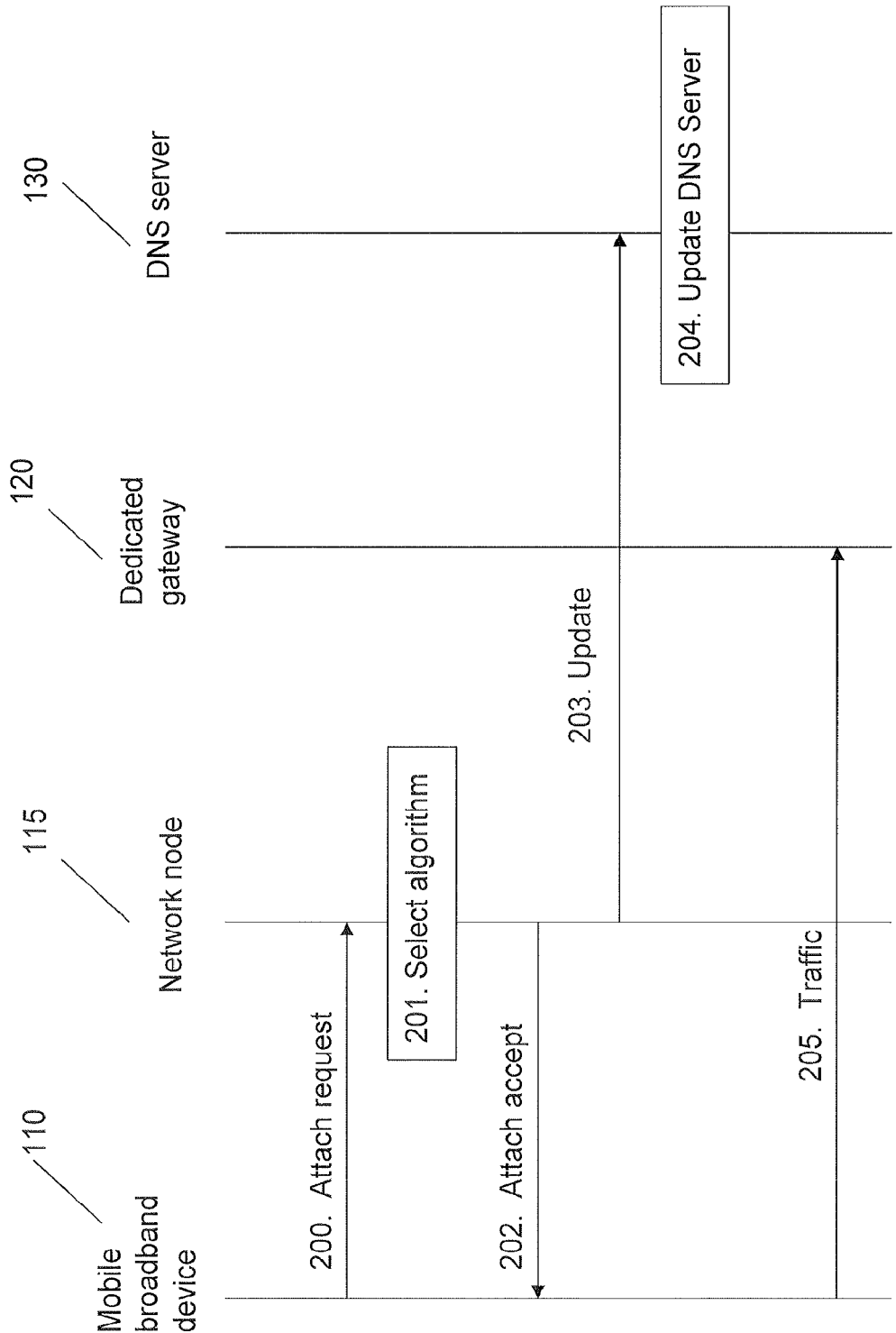
FIG. 2 is a combined flow and signaling diagram illustrating an example procedure for directing mobile broadband devices to a dedicated gateway.

FIG. 2 is a combined flowchart and signaling diagram illustrating an example of a method for directing mobile broadband devices 110 to dedicated gateways 120.

Step 200

The mobile broadband device 110 sends an attach request to the network node 115, e.g. the SGSN or MME.

As mentioned above, the attach request comprises an information element indicating a mobile broadband device 110, which implies that the mobile broadband device 110 shall be programmed to always send traffic to the SGSN or MME 115. The indication may be the information element Mobile Station Network Capability in an attach request message, in both LTE and HSPA. In other words, the user equipment 105 indicates that it is a specific type of equipment, i.e. equipment that does not require a complex package of features or large bandwidth.

The purpose of the Mobile Station Network Capability information element is to provide the network node 115 with information concerning aspects of the user equipment 105 related to GPRS. The contents might affect the manner in which the network node 115 handles the operation of the user equipment 105. The Mobile Station Network Capability information element indicates general user equipment characteristics and it shall therefore, except for fields explicitly indicated, be independent of the frequency band of the channel it is sent on. The Mobile Station Network Capability information element is a type 4 information element with a maximum of 10 octets length.

The indication in the Mobile Station Network Capability information element indicates the type of device. It is used by the network node 115 to decide if a mobile broadband optimized connection may be used. The indication may be in the form of a single bit which is always set to "1" by a mobile broadband device 110 and to "0" otherwise:

0 No—this is not a mobile broadband device.
1 Yes—this is a mobile broadband device.

The Mobile Station Network Capability information element is the same in both HSPA and LTE.

An alternative is that the indication may be a proprietary information element, a Mobile Broadband Device (MBD) information element, in an attach request, both in HSPA and LTE. The attach request message is sent by the mobile broadband device 110 to the network node 115 in order to perform a GPRS or combined GPRS attach. The purpose of the MBD information element is for the user equipment 105 to notify that this attach is done from a mobile broadband device 110. The network node 115 may therefore apply a connection setup that is optimized for mobile broadband, for example connection via dedicated gateways 120, that are feature- and cost-optimized for fast internet access. The MBD information element is a type 4 information element with a length of 3 octets. If the proprietary information element is read by devices from other vendors, the information element is ignored by these devices and are not disturbed by it.

The mobile broadband device information element can have the following values:
0 No—this is not a mobile broadband device
1 Yes—this is a mobile broadband device The MBD information element may be the same in both HSPA and LTE.

Step 201

Based on the attached request received from the mobile broadband device 110, the network node 115, e.g. the SGSN or MME, selects an algorithm for selecting a dedicated gateway 120 to be used for traffic from the user equipment 105 to the operator. This selection of algorithm is a part of an APN resolution.

The selection of the algorithm can be done in different ways. One alternative way is by decorating an APN string comprising an information element indicating mobile broadband, e.g. " ... mb ... ", before it is sent for DNS resolution.

Another alternative way for selecting an algorithm is by doing the DNS resolution in two steps; a first step where a specific DNS request to the DNS server 130 is sent to receive a list of new Fully Qualified Domain Name (FQDN), i.e. new alternative domain names of dedicated gateways 120. In a second step, the SGSN/MME 115 selects a domain name that is marked as mobile broadband service, e.g. " ... mb ... ". And in a third step, the selected domain name is sent to the DNS server 130 to get the IP address of that dedicated gateway 120.

Step 202

The network node 115 sends an attach accept message to the mobile broadband device 110.

Step 203

The network node 115 sends a message to the DNS server 130 to update its content, e.g. a database, with the dedicated gateway 120.

Step 204

The DNS server 130 updates its content and thus introduces dedicated gateways 120 in the network 125. The update may be done by configuring the DNS server 130 with special entries for the nodes that are dedicated gateways 120.

Step 205

The mobile broadband device 110 sends its traffic to the dedicated gateway 120.

Figure 3:
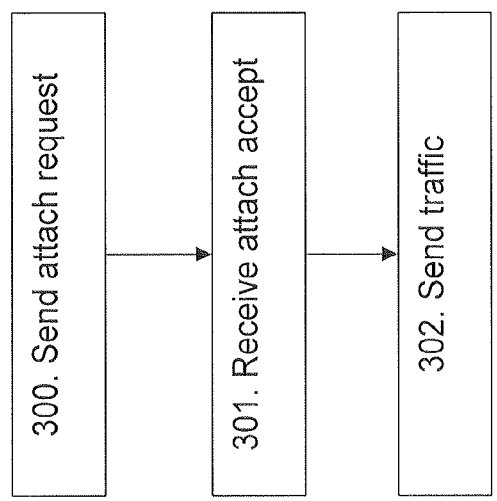
FIG. 3 is a flowchart illustrating embodiments of a method in a mobile broadband device.

The method described above will now be described seen from the perspective of the mobile broadband device 110. FIG. 3 is a flowchart describing the present method in the mobile broadband device 110 for directing the mobile broadband device 110 to a dedicated gateway 120. The mobile broadband device 110 being comprised in a user equipment 105 in a wireless communication network 100. The wireless communication network 100 further comprises a network node 115 arranged to be connected to the mobile broadband device 110.

The method comprises the following steps to be performed in the mobile broadband device 110:

Step 300

The mobile broadband device 110 sends an attach request message to the network node 115. The attach request comprising an information element indicating that the device 110 is a broadband device.

Optionally, the network node 115 may be a SGSN or MME.

Optionally, the information element may be a mobile station network capability element in a HSPA network or a LTE network.

Optionally, the information element may be a proprietary information element in a HSPA network or a LTE network.

Step 301

The mobile broadband device 110 receives an attach accept message from the network node 115 comprising address information of the dedicated gateway 120

Optionally, the dedicated gateway 120 may be a GGSN or SGW/PGW.

Step 302

The mobile broadband device 110 sends traffic to the dedicated gateway 120.

Figure 4:
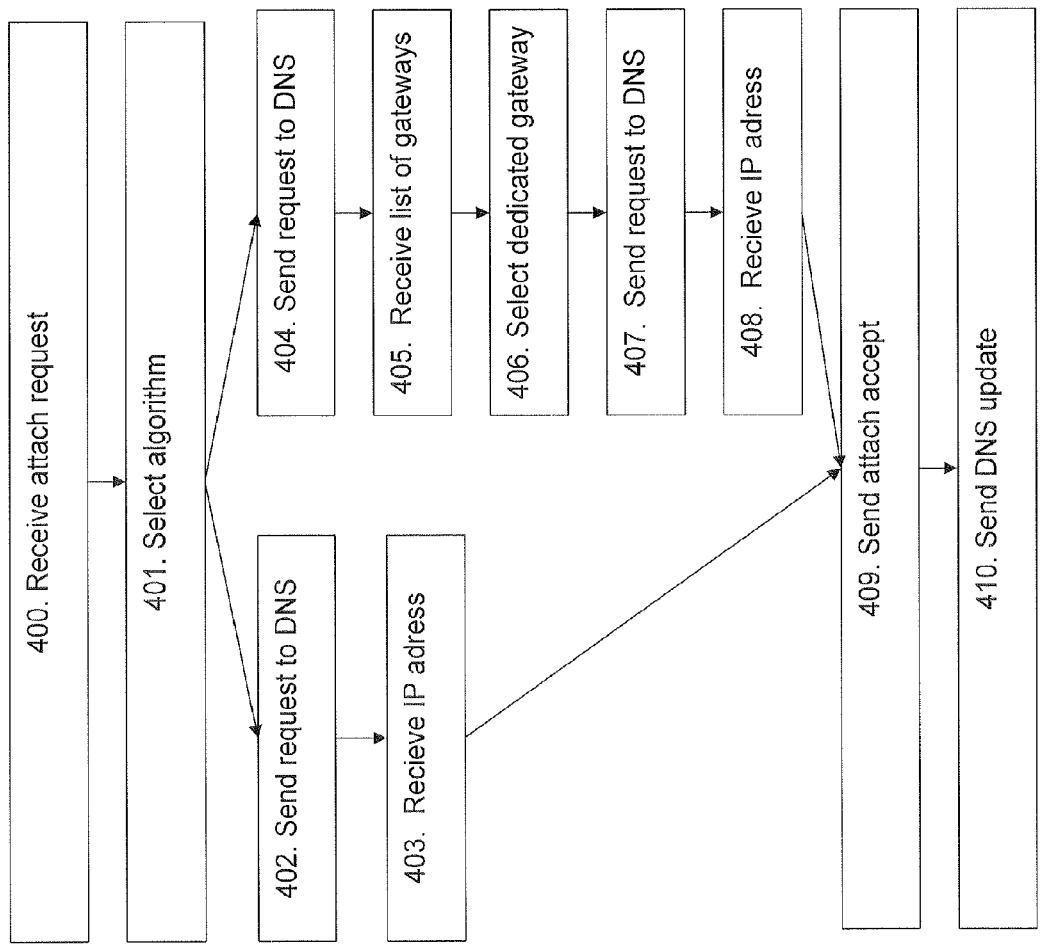
FIG. 4 is a flowchart illustrating embodiments of a method in a network node.

The method described above will now be described seen from the perspective of the network node 115. FIG. 4 is a flowchart describing the present method in the network node 115 for directing a mobile broadband device 110 to a dedicated gateway 120. The mobile broadband device 110 being comprised in a user equipment 105 in a wireless communication network 100. The wireless communication network 100 comprises a DNS server 130 arranged to be connected to the user equipment 105. The network node 115 is comprised in the wireless communication network 100 and arranged to be connected to the mobile broadband device 110.

The method comprises the following steps to be performed in the network node 115:

Step 400

The network node 115 receives an attach request message from the mobile broadband device 110. The attach request comprises an information element indicating that the device 110 is a broadband device.

Optionally, the network node 115 may be a SGSN or MME.

Optionally, the dedicated gateway 120 may be a GGSN or SGW/PGW.

Optionally, the information element may be a mobile station network capability element in a HSPA or a LTE network.

Optionally, the information element may be a proprietary information element in a HSPA network or a LTE network.

Step 401

The network node 115 selects an algorithm. The selected algorithm is arranged to select a dedicated gateway 120.

Step 402

This is an optional step. A request is sent from the network node 115 to a DNS server 130. The request comprises an APN string comprising an information element indicating a mobile broadband device 110.

Step 403

This is an optional step. The network node 115 receives an IP address of the dedicated gateway 120.

Step 404

This is an optional step. The network node 115 sends a request to a DNS server 130.

Step 405

This is an optional step. The network node 115 receives a list of alternative gateways from the DNS server 130.

Step 406

This is an optional step. The network node 115 selects a dedicated gateway 120 from the list.

Step 407

This is an optional step. The network node 115 sends a request to the DNS server 130 to get an IP address for the selected dedicated gateway 120.

Step 408

This is an optional step. The network node 115 receives the IP address of the selected dedicated gateway 120.

Step 409

The network node 115 sends an attach accept message to the mobile broadband device 110.

Step 410

The network node 115 sends an update message to a DNS server 130.

Figure 5:
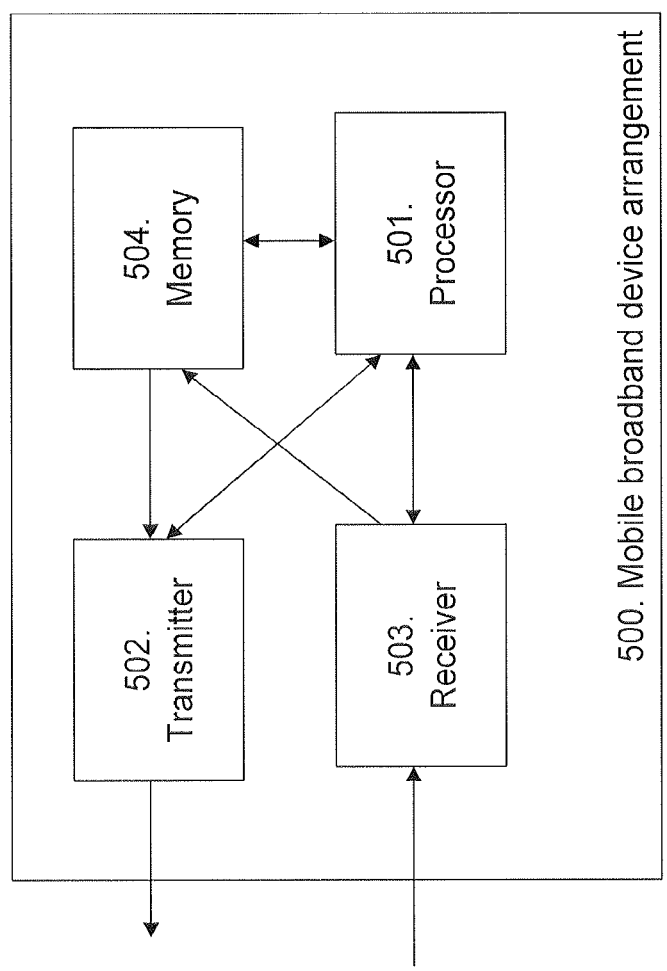
FIG. 5 is a schematic block diagram illustrating embodiments of a mobile broadband device arrangement.

To perform the method steps shown in FIG. 3 for directing a mobile broadband device 110 to a dedicated gateway 120, the mobile broadband device 110 comprises a mobile broadband device arrangement 500 as shown in FIG. 5. The mobile broadband device 110 is arranged to be directed to a dedicated gateway 120, and it is comprised in a user equipment 105 in a wireless communication network 100. The wireless communication network 100 further comprises a network node 115 arranged to be connected to the mobile broadband device 110.

The mobile broadband device arrangement 500 comprises a processor 501 arranged to provide an attach request message. The attach request comprises an information element indicating that the device 110 is a broadband device. The mobile broadband device arrangement 500 also comprises a transmitter 502 arranged to transmit the attach request message to the network node 115, and a receiver 503 arranged to receive an attach accept message from the network node 115 comprising address information of the dedicated gateway 120. It further comprises a memory 504 arranged to store the received attach accept message and the transmitter 502 is also arranged to transmit traffic to the dedicated gateway 120.

Figure 6:
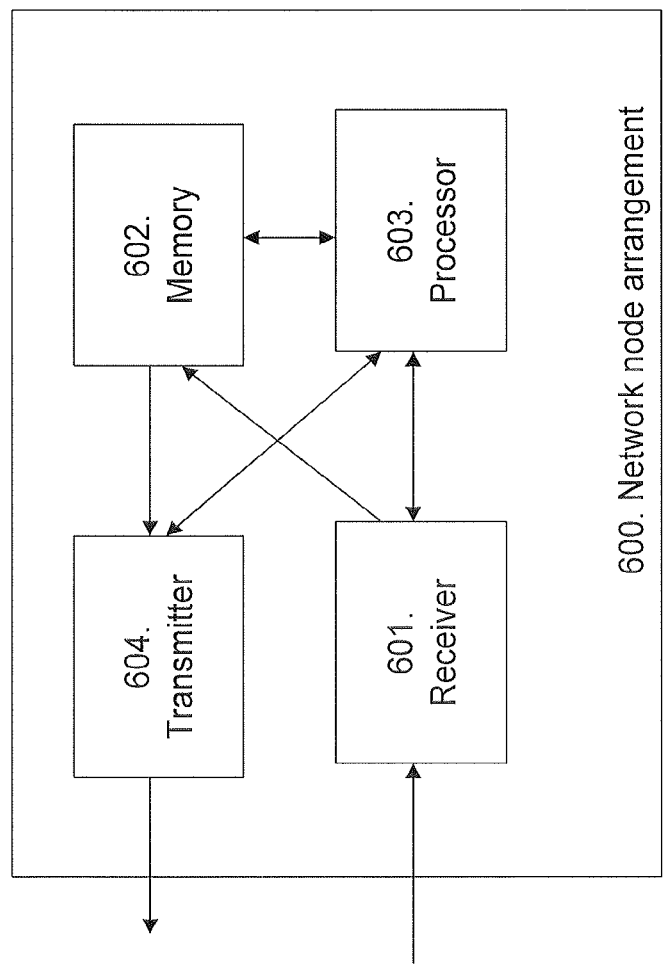
FIG. 6 is a schematic block diagram illustrating embodiments of a network node arrangement.

To perform the method steps shown in FIG. 4 for directing a mobile broadband device 110 to a dedicated gateway 120, the network node 110 comprises a network node arrangement 600 as shown in FIG. 6. The network node 115 is arranged to direct a mobile broadband device 110 to a dedicated gateway 120. The mobile broadband device 110 is comprised in a user equipment 105 in a wireless communication network 100. The wireless communication network 100 comprises a DNS server 130 arranged to be connected to the user equipment 105. The network node 115 is comprised in the wireless communication network 100 and arranged to be connected to the mobile broadband device 110.

The network node arrangement 600 comprises a receiver 601 arranged to receive an attach request message from the mobile broadband device 110. The attach request comprises an information element indicating that the device 110 is a broadband device. The arrangement 600 also comprises a memory 602 arranged to store the received attach request message, and a processor 603 arranged to select an algorithm. The selected algorithm is arranged to select a dedicated gateway 120. A transmitter 604 arranged to send an attach accept message to the mobile broadband device 110 is also comprised in the network node arrangement 600. The transmitter 604 is further arranged to send an update message to the DNS server 130.

The present solution for directing a mobile broadband device 110 to a dedicated gateway 120 may be implemented through one or more processors, such as a processor 501, 603 depicted in FIGS. 5 and 6, together with computer program code for performing the functions of the present solution. The program code mentioned above may also be provided as a computer program product, for instance in the form of a data carrier carrying computer program code for performing the present solution when being loaded into the mobile broadband device 110 and network node 115. One such carrier may be in the form of a CD ROM disc. It is however feasible with other data carriers such as a memory stick. The computer program code can furthermore be provided as pure program code on a server and downloaded to the mobile broadband device 110 and network node 115 remotely.

Summarized, the present solution enables a simplification and cost reduction of the mobile system for the mobile broadband user segment. More competitive offerings for operators in the bit-pipe segment will also be possible with the present solution. It applies to both SAE/EPC and traditional Gn-based core networks with GGSN. It can be used over both evolved Universal Terrestrial Radio Access Network (E-UTRAN) and Universal Terrestrial Radio Access Network (UTRAN)/HSPA. An operator which use low cost dedicated gateways for mobile broadband users and combines this with 3G Direct Tunnel (3GDT), bypassing SGSN for the user plane, will have a very cost efficient solution in the core network. Since these users don't generate much signaling (typically no mobility and only one Packet Data Protocol (PDP) context/Bearer) the control plane costs for these users would also be low.

It should be noted that the word "comprising" does not exclude the presence of other elements or steps than those listed and the words "a" or "an" preceding an element do not exclude the presence of a plurality of such elements. The invention can at least in part be implemented in either software or hardware. It should further be noted that any reference signs do not limit the scope of the claims, and that several "means", "devices", and "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method in a mobile broadband device (110) for directing the mobile broadband device (110) to a dedicated gateway (120), which dedicated gateway is dedicated to mobile broadband traffic, the mobile broadband device (110) being comprised in a user equipment (105) in a wireless communication network (100), the method comprises the following steps:

sending (200, 300) an attach request message to a network node (115), the attach request comprising an information element indicating that the device (110) is a broadband device, indicating that mobile broadband traffic should be sent to the dedicated gateway (120) and requesting setup of a connection to the dedicated gateway, the network node (115) being comprised in the wireless communication network (100);

receiving (301) an attach accept message from the network node (115) comprising address information of the dedicated gateway (120); and sending (302, 205) mobile broadband traffic to the dedicated gateway (120) using the connection, which dedicated gateway is dedicated for mobile broadband traffic.

2. The method according to claim 1, wherein the network node (115) is a serving general packet radio service support node "SGSN" or mobility management entity "MME".

3. The method according to claim 1, wherein the dedicated gateway (120) is a gateway general packet radio service support node "GGSN" or serving gateway "SGW"/packet gateway "PGW".

4. The method according to claim 1, wherein the information element is a mobile station network capability element in a high speed packet access network "HSPA" or a long term evolution "LTE" network.

5. The method according to claim 1, wherein the information element is a proprietary information element in a high speed packet access network "HSPA" or a long term evolution "LTE" network.

6. An arrangement (500) in a mobile broadband device (110), wherein the mobile broadband device (110) is arranged to be directed to a dedicated gateway (120), which dedicated gateway is dedicated for mobile broadband traffic, the mobile broadband device (110) being comprised in a user equipment (105) in a wireless communication network (100), the mobile broadband device arrangement (500) comprises:

a processor (501) arranged to provide an attach request message, the attach request comprising an information element indicating that the device (110) is a broadband device, indicating that mobile broadband traffic should be sent to the dedicated gateway (120) and requesting setup of a connection to the dedicated gateway;

a transmitter (502) arranged to transmit the attach request message to a network node (115) comprised in the wireless communication network (100);

a receiver (503) arranged to receive an attach accept message from the network node (115) comprising address information of the dedicated gateway (120);

a memory (504) arranged to store the attached accept message; and a transmitter (502) arranged to transmit mobile broadband traffic to the dedicated gateway (120) using the connection, which dedicated gateway is dedicated for mobile broadband traffic.

7. An arrangement (600) in a network node (115), wherein the network node (115) is arranged to direct a mobile broadband device (110) to a dedicated gateway (120), which dedicated gateway is dedicated for mobile broadband traffic, the mobile broadband device (110) being comprised in a user equipment (105) in a wireless communication network (100), the network node (115) being comprised in the wireless communication network (100) and arranged to be connected to the mobile broadband device (110);

the network node arrangement (600) comprises:

- a receiver (601) arranged to receive an attach request message from the mobile broadband device (110), the attach request comprising an information element indicating that the device (110) is a broadband device, indicating that mobile broadband traffic should be sent to the dedicated gateway (120) and requesting setup of a connection to the dedicated gateway;
- a memory (602) arranged to store the received attach request message;
- a processor (603) arranged to select an algorithm, the selected algorithm is arranged to select a dedicated gateway (120);
- a transmitter (604) arranged to send an attach accept message to the mobile broadband device (110); and
- a transmitter (604) arranged to send an update message to a domain name server, referred to as DNS server (130) comprised in the wireless communication network (100) and arranged to be connected to the user equipment (105).

\* \* \* \* \*